(12) United States Patent
Jacuk

(10) Patent No.: US 10,421,599 B2
(45) Date of Patent: *Sep. 24, 2019

(54) RING FOR A DEVICE FOR DISPENSING A FLUID PRODUCT

(71) Applicant: APTAR FRANCE SAS, Le Neubourg (FR)

(72) Inventor: Christophe Jacuk, Le Vaudrevil (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,604

(22) Filed: Sep. 7, 2016

(65) Prior Publication Data

US 2016/0376088 A1 Dec. 29, 2016

Related U.S. Application Data

(63) Continuation of application No. 14/009,569, filed as application No. PCT/FR2012/050720 on Apr. 3, 2012.

(30) Foreign Application Priority Data

Apr. 6, 2011 (FR) ...................... 11 52988

(51) Int. Cl.
*B65D 83/38* (2006.01)
*B65D 83/44* (2006.01)
(Continued)

(52) U.S. Cl.
CPC ............. *B65D 83/44* (2013.01); *B65D 83/38* (2013.01); *B65D 83/54* (2013.01); *C08L 23/16* (2013.01);
(Continued)

(58) Field of Classification Search
CPC .... C08L 23/16; B05B 11/305; B05B 11/3043; B65D 83/14; B65D 83/38; B65D 83/44; B65D 83/54; B65D 83/565; B65D 83/00
(Continued)

(56) References Cited

U.S. PATENT DOCUMENTS 3,977,576 A * 8/1976 Amabili ................. B65D 83/48
222/402.1
4,953,759 A * 9/1990 Schmidt ................. B65D 83/54
222/402.2
(Continued)

FOREIGN PATENT DOCUMENTS

CA 2264057 A1 2/1998
DE 10 2005 002 444 A1 7/2006
(Continued)

OTHER PUBLICATIONS

"MDI propellants", As Appeared in Ihanlation Feb. 2008, www.inhalationmag.com, thee (3) pages.
(Continued)

*Primary Examiner* — Paul R Durand
*Assistant Examiner* — Andrew P Bainbridge
(74) *Attorney, Agent, or Firm* — Sughrue Mion, PLLC

(57) ABSTRACT

A ring (10) for arranging around a valve body (21) of a fluid dispenser valve (20) that is mounted by means of a fastener capsule (50), such as a crimpable capsule, on a reservoir (1) containing fluid to be dispensed, said ring (10) being made as a single piece including at least one inner portion (100, 110) that co-operates with said valve body (21), and a radial flange (11) that forms a neck gasket that extends between the neck of the reservoir (1) and the fastener capsule (50).

18 Claims, 3 Drawing Sheets

(51) Int. Cl.
- B65D 83/54 (2006.01)
- C08L 23/16 (2006.01)
- *B05B 11/00* (2006.01)
- *B65D 83/00* (2006.01)
- *B65D 83/14* (2006.01)
- *B65D 83/56* (2006.01)

(52) U.S. Cl.
CPC ......... *B05B 11/305* (2013.01); *B05B 11/3043* (2013.01); *B65D 83/00* (2013.01); *B65D 83/14* (2013.01); *B65D 83/565* (2015.07)

(58) Field of Classification Search
USPC .......................................... 222/402.1–402.25
See application file for complete search history.

(56) References Cited

U.S. PATENT DOCUMENTS

| | | | |
|---|---|---|---|
| 5,037,012 A | 8/1991 | Langford | |
| 5,632,421 A | 3/1997 | Colombo | |
| 5,697,532 A | 12/1997 | Wilde et al. | |
| 6,131,777 A * | 10/2000 | Warby | B65D 83/38 222/402.1 |
| 6,737,044 B1 * | 5/2004 | Dickinson | A61K 9/008 128/200.14 |
| 7,392,922 B2 | 7/2008 | Vanstaan et al. | |
| 2004/0222244 A1 | 11/2004 | Groeger | |
| 2005/0070665 A1 | 3/2005 | Ludlow, III | |
| 2005/0075611 A1 | 4/2005 | Hetzler et al. | |
| 2006/0273116 A1 * | 12/2006 | Burghaus | B65D 83/38 222/402.1 |
| 2007/0145081 A1 * | 6/2007 | Goujon | B65D 83/54 222/402.2 |
| 2007/0158369 A1 | 7/2007 | Margheritis et al. | |
| 2008/0230567 A1 * | 9/2008 | Ohbi | A61M 15/009 222/402.24 |
| 2009/0007904 A1 * | 1/2009 | Schuster | A61K 9/0073 128/200.23 |
| 2009/0008584 A1 * | 1/2009 | Fontela | B65D 83/38 251/118 |
| 2010/0051651 A1 * | 3/2010 | Allsop | B65D 83/54 222/402.2 |
| 2012/0021151 A1 * | 1/2012 | Tatarka | B32B 1/08 428/35.1 |
| 2012/0055467 A1 * | 3/2012 | Brambilla | A61M 15/009 128/200.21 |
| 2013/0000636 A1 * | 1/2013 | Jacuk | C08L 23/16 128/203.12 |
| 2018/0079587 A1 * | 3/2018 | Jacuk | B65D 83/38 |

FOREIGN PATENT DOCUMENTS

| | | |
|---|---|---|
| EP | 0 671 433 A1 | 9/1995 |
| FR | 2 865 198 A1 | 7/2005 |
| WO | 2007/074274 A1 | 7/2007 |
| WO | 2007/107174 A1 | 9/2007 |

OTHER PUBLICATIONS

"TOPAS Elastomer E-140 Now Available", pp. 8-10.
English translation of the International Preliminary Report on Patentability for PCT/FR2012/050720.

* cited by examiner

RING FOR A DEVICE FOR DISPENSING A FLUID PRODUCT

CROSS REFERENCE TO RELATED APPLICATIONS

The present application is a Continuation of U.S. patent application Ser. No. 14/009,569, filed Oct. 3, 2013, which is a National Stage of International Application No. PCT/FR2012/050720, filed on Apr. 3, 2012, claiming priority based on French Patent Application No. 1152988 filed Apr. 6, 2011, the contents of all of which are incorporated herein by reference in their entirety.

The present invention relates to a ring for a fluid dispenser valve and to a fluid dispenser device including such a ring.

It is known to use rings with aerosol dispenser valves, in particular metering valves that are mounted on a reservoir containing the fluid to be dispensed. In particular, such rings are used in valves that are suitable for use upsidedown, i.e. with the valve arranged below the reservoir while a dose of fluid is being expelled. Such rings generally fulfill two main functions, namely firstly ensuring that a maximum quantity of the fluid contained inside the reservoir can be dispensed, by limiting the dead volume situated below the inlet of the valve when said valve is in its upsidedown working position. Secondly, such rings also serve to limit contact between the fluid and the neck gasket that is generally arranged between the neck of the reservoir and the fastener hoop or capsule that serves to fasten the valve on the receptacle. By limiting contact between the gasket and the fluid contained in the reservoir, the risks of the fluid becoming contaminated by extractables that can be leached from said gasket are limited, and also deterioration of the gasket as a result of its contact with the fluid, in particular a propellant gas, is limited.

In general, the ring is assembled on the valve body by radially clamping an inner edge of the ring onto said valve body. That configuration presents the drawback that when the radial clamping is too strong, it can deform the valve body over time, and in particular the inside of said body, and that can cause the valve to malfunction. Numerous valves provide a relatively narrow gap between the valve member that slides and the valve body. Radial deformation of the valve body can thus cause friction and even jamming of said valve member. In addition, in order to perform the two above-mentioned functions effectively, the ring is generally in contact, via its outer portion, with a portion of the neck of the reservoir, which contact is not necessarily leaktight contact. In particular, when the fastener capsule is a crimpable capsule, the crimping causes the neck of the reservoir to deform radially, thereby increasing the radial compression exerted on the ring. Once again, this increase in the radial compression transmitted to the inner edge of the ring can cause an increase in the stress exerted on the valve body, and can cause said valve body to deform.

Document WO 2007/074274 describes a ring that includes a deformable wall for limiting stress on the valve body, and that also makes it possible to limit contact between the fluid and the neck gasket. The ring makes it possible to solve the above-mentioned problems in part. Documents U.S. Pat. No. 5,697,532, FR 2 865 198, and DE 10 2005 002444 describe prior-art devices.

An object of the present invention is to provide a ring for a fluid dispenser device that does not have the above-mentioned drawbacks, and that improves the ring of document WO 2007/074274.

More particularly, an object of the present invention is to provide a ring for an aerosol dispenser device that avoids any excessive radial stress on the valve body, thereby avoiding any risk of the valve body deforming excessively, in particular while the valve is being crimped on the reservoir.

Another object of the present invention is to provide such a ring that makes it possible to compensate for dispersion in manufacturing tolerances, without increasing radial stress on the valve body.

Another object of the present invention is to provide such a ring that maximizes the amount of the content of the reservoir that can be dispensed.

Another object of the present invention is to provide such a ring that limits, as much as possible, the interactions with the fluid and the propellant gas contained in the reservoir.

Another object of the present invention is to provide a fluid dispenser device that is simple and inexpensive to manufacture and to assemble, reducing in particular the number of component parts of the fluid dispenser device.

The present invention thus provides a ring for arranging around a valve body of a fluid dispenser valve that is mounted by means of a fastener capsule, such as a crimpable capsule, on a reservoir containing fluid to be dispensed, said ring being made as a single piece including at least an inner portion that co-operates with said valve body, and a radial flange that forms a neck gasket that extends between the neck of the reservoir and the fastener capsule, said ring being made of a material that includes cyclo olefin copolymer (COC) elastomer.

Advantageously, said ring includes a first radially-inner portion that co-operates with a portion of the valve body, and a second inner portion that co-operates with another portion of the valve body.

Advantageously, said first radially-inner portion has a deformable lip.

Advantageously, the contact surface of the lip with the valve body has a shape that is stepped.

Advantageously, said lip includes a peripheral recess that gives it its capacity to deform.

Advantageously, said ring includes a deformable axial wall that extends towards the bottom of the reservoir, and that is capable of deforming elastically in a radially-inward direction.

Advantageously, the outer surface of the deformable axial wall is substantially smooth before fastening the fastener capsule.

Advantageously, said ring includes a plurality of axial recesses that extend around the periphery of the ring, radially inwards from the neck-gasket-forming radial flange.

Advantageously, said recesses are separated by radial ribs.

Advantageously, below said neck-gasket-forming radial flange, said ring includes projecting profiles that are distributed around the outer periphery of said ring, said projecting profiles being separated by grooves.

Advantageously, said ring is constituted by COC elastomer.

The present invention also provides a fluid dispenser device comprising a reservoir containing fluid to be dispensed and a propellant gas, in particular of the hydrofluoroalkane (HFA) type, and an aerosol valve, and including a ring as described above.

Advantageously, said valve body includes at least one opening so as to enable fluid to pass from the reservoir into said valve, said first radially-inner portion being situated at the bottom edge of said opening, in the upsidedown working position, with the valve arranged below said reservoir.

These characteristics and advantages and others of the present invention appear more clearly from the following detailed description of several embodiments thereof, given by way of non-limiting example, and with reference to the accompanying drawings, in which.

Figure 1:
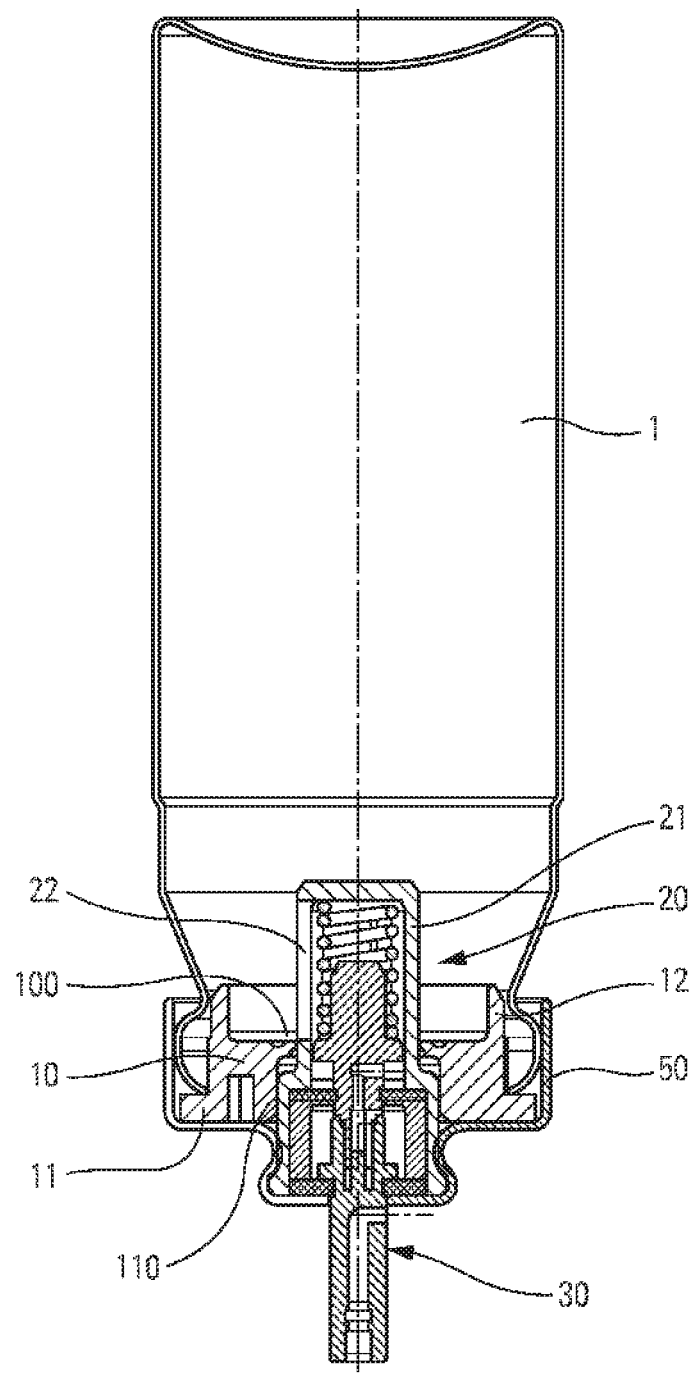
FIG. 1 is a diagrammatic section view of an aerosol dispenser device in its upsidedown working position, including a ring in an advantageous embodiment of the present invention.

With reference more particularly to FIG. 1, the aerosol device includes a reservoir 1 containing the fluid to be dispensed. The fluid may be of the pharmaceutical type, and propellant gas, such as a gas of the HFA type, may be provided for dispensing the fluid through an aerosol valve 20, preferably a metering valve. The aerosol valve includes a valve body 21 in which a valve member 30 slides. The valve body 21 is assembled on the neck of the reservoir 1 by means of a fastener capsule 50, in particular of the crimpable type, with a neck gasket interposed therebetween for sealing purposes. In FIG. 1, the valve is shown in its working position, which is its upsidedown position, i.e. while a dose is being expelled, the valve is situated below the reservoir. The valve body 21 includes one or more openings 22 making it possible to fill the valve with fluid from the reservoir, in particular by gravity. The openings are shown in the form of lateral longitudinal slots 22 that extend over a portion of the height of the valve body 21. In a variant, one or more openings of different shapes could be provided for this purpose.

In the invention, a ring 10 is assembled around the valve body 21. The ring 10 is mainly for ensuring that the reservoir is emptied as much as possible by limiting, as much as possible, the dead volume situated below the bottom edge of the opening(s) 22 of the valve body 21 when the valve is in its upsidedown working position. The ring 10 includes a radial flange 11 that forms the neck gasket that is interposed between the neck of the reservoir and the fastener capsule 50. The invention thus makes it possible to eliminate a part, namely the neck gasket, thereby simplifying the manufacture and the assembly of the device.

An advantage of the neck-gasket-forming radial flange 11 is that, after assembly, the ring 10 cannot slide along the valve body 21, since said radial flange 11 is held between the neck of the reservoir and the capsule 50. Optionally, beads could be formed on the top surface (in the position in FIG. 3) of the neck-gasket-forming radial flange 11, so as to improve the sealing with the capsule 50.

The ring 10 includes at least one first radially-inner portion 100 for co-operating with the valve body 21. The first radially-inner portion 100 is preferably the radially-innermost portion of the ring 10. A second inner portion 110 may advantageously be provided to co-operate with another portion of the valve body. This configuration makes it possible to distribute the radial stress exerted by the ring 10 on the valve body 21 over two contact zones instead of one, thereby firstly limiting the radial stress exerted on each of said zones individually, and secondly making it possible to avoid substantially any sliding of the ring 10 on the body 21, said ring being clamped against said body at two distinct locations.

The ring 10 includes a deformable axial wall 12 that is capable of deforming elastically in a radially-inward direction. In particular, the purpose of the deformable wall 12 is to compensate for and to absorb any radial stress that might be exerted thereon by the reservoir 1, in particular at the moment when the fastener capsule 50 is being crimped on, by said wall deforming radially inwards. The deformable wall 12 is provided on a radially-outer portion of the ring, and extends axially towards the bottom of the reservoir. This configuration makes it easier to assemble the ring around the valve body 21. It also makes it possible to provide the ring with dimensions such that the deformable portion is deformed only while the capsule 50 is being crimped, and not while the ring is being assembled around the valve body, nor while the valve is being inserted into the reservoir, since that might cause the ring to move axially along the valve body. In addition, this specific shape, with the deformable wall 12 arranged radially outwards and pointing towards the bottom of the reservoir, enables said deformable wall to participate in guiding fluid towards the opening(s) 22 of the valve body 21. During crimping, contact between the reservoir and the deformable wall 12 is advantageously made in a zone of the deformable wall that is easily deformed. In the embodiment shown in FIG. 1, the zone is situated towards the free axial end of said deformable wall 12. The zone could be axially offset, but preferably it should not be situated right at the start of the wall where its capacity to deform elastically is small, or even non-existent.

Another advantage of a deformable wall that is directed towards the bottom of the reservoir is that the neck gasket portion 11 of the ring 10 is urged axially or thrust against the capsule after crimping. After deforming, the wall 12 exerts a force having a component that is axial and that is directed towards the neck gasket portion 11. This improves the sealing of the gasket. This also improves the fastening of the ring 10 on the valve body 21. If the deformable wall were directed in the opposite direction, the ring would, on the contrary, be urged away from the gasket once the wall is deformed.

Advantageously, the outside surface of the deformable axial wall portion 12 is smooth, preferably mirror-polished, i.e. with a roughness index that is less than 1.0, advantageously less than 0.8, and preferably about 0.05. This configuration promotes leaktight contact between the reservoir and the ring after crimping.

As a result of the ring 10 including a deformable wall portion 12, deformation of the reservoir 1 is not automatically transmitted to the inner edge(s) 100 and 110 of said ring, and consequently is not automatically transmitted to the valve body 21. Any risk of the valve body 21 deforming, that would in turn risk causing the valve to jam or malfunction, is thus avoided.

Figure 3:
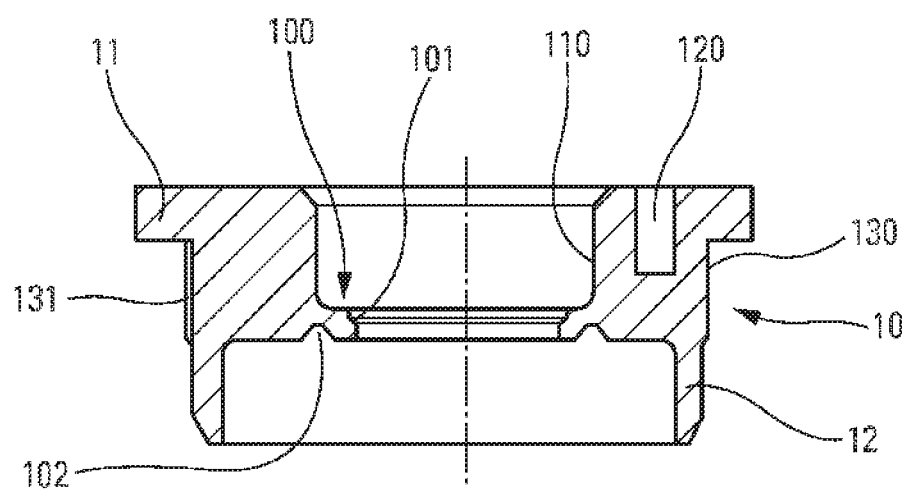
FIG. 3 is a diagrammatic section view of the FIG. 1 ring.

As can be seen in FIG. 3, the first radially-inner portion 100 comprises a deformable lip that may advantageously form a substantially leaktight contact with the valve body 21. More particularly, the contact surface 101 of the lip with the valve body 21 may have a shape that is stepped, and a peripheral recess 102 gives it its capacity to deform. Thus, without exerting a high level of radial stress on the valve body, the first inner portion 100 of the ring 10 can co-operate in substantially leaktight manner with said valve body 21.

Figure 2:
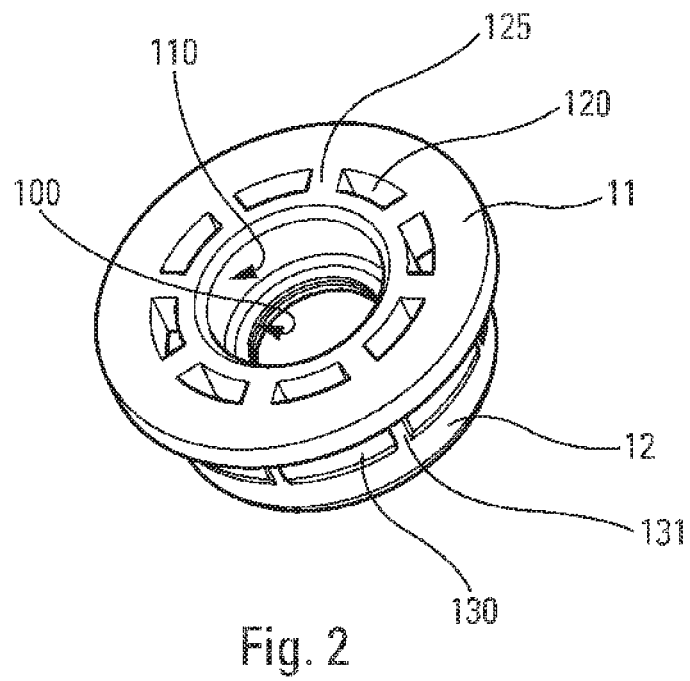
FIG. 2 is a diagrammatic perspective view from above of the FIG. 1 ring.

In order to avoid shrink marks after molding, the ring 10 advantageously includes a plurality of axial recesses 120 that extend around the periphery of the ring, radially inwards from the neck-gasket-forming radial flange 11. The recesses 120 are advantageously separated by radial ribs 125, visible in FIG. 2, that provide the necessary stiffness to the ring.

Below the neck-gasket-forming radial flange 11, the ring 10 may include a plurality of projecting profiles 130 that are distributed around the outer periphery, and that are separated by grooves 131. The profiles make it possible to improve the assembly of the valve in the reservoir, ensuring centering during insertion into the reservoir. Air or propellant gas contained inside the reservoir may escape via the grooves 131 when the valve is assembled on the reservoir, e.g. for devices that are partially pre-filled before final assembly of the valve.

The ring 10 is thus formed as a single piece that is to provide sealing as a neck gasket, while being in contact with the fluid contained in the reservoir. The material used to make the ring 10 should thus present properties that enable it to provide a sealing function, while simultaneously not having harmful interactions with the fluid and/or the propellant gas contained in the reservoir.

A material that is particularly suitable for making the ring of the invention is COC elastomer. Advantageously, COC elastomer forms the only base material, but it is possible to envisage making a COC elastomer alloy with one or more other materials, in particular those listed below.

COC is a copolymer that is formulated with a norbornene ring and polyethylene. Norbornene comes from synthesizing ethylene and a cyclopentadiene. Conventional COC is a material that is substantially rigid. COC elastomer is thus a COC with an increased polyethylene content, thereby imparting elastomeric properties to said material. COC elastomer is thus not a mixture or an alloy of conventional COC with an elastomer material, but a material as such that presents certain properties that are similar to elastomers.

COC elastomer is a material having a glass transition temperature lying in the range −10° C. to 15° C., a crystalline melting point lying in the range 50° C. to 120° C., a crystallinity by weight lying in the range 5% to 40%, and a norbornene content lying in the range 2 mol % to 15 mol %.

The advantages of COC elastomer are numerous.

Firstly, it presents a chemical nature that is very inert since, in contrast to other elastomer materials, it does not include any reactive open or available double bond.

COC elastomer also has a very low level of extractables, i.e. very few particles known as extractables leach out from gaskets made out of COC elastomer, even when the gaskets are in contact with HFA-type propellant gases that are particularly aggressive. In particular, COC elastomer does not present fatty acids as extractables, unlike elastomers and thermoplastic elastomers. Extractables that exist with COC elastomer thus mainly include antioxidants.

Figure 4:
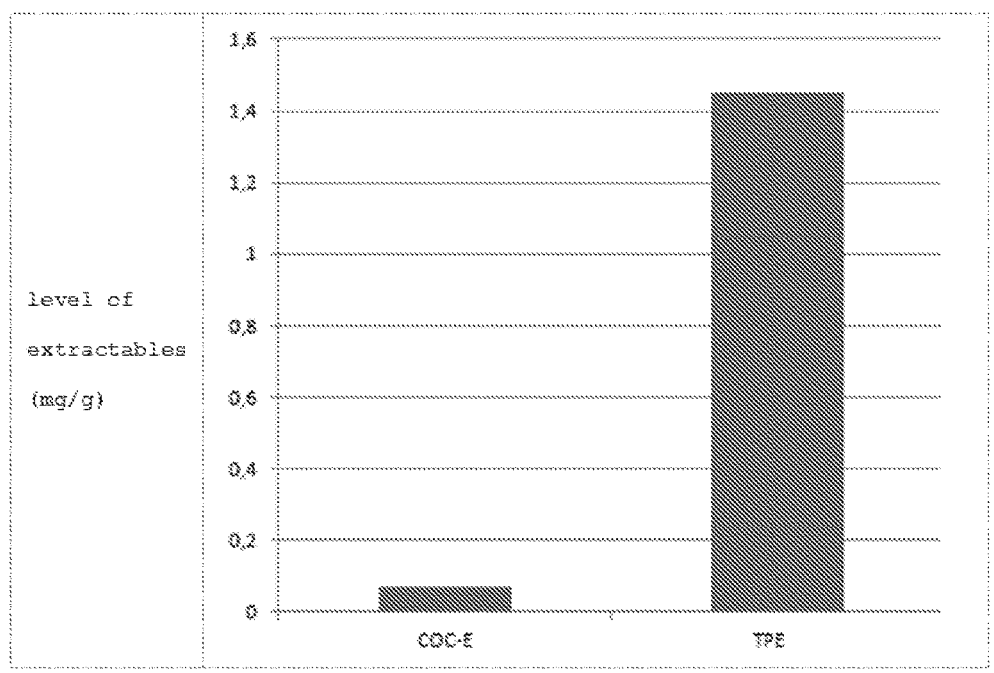
FIG. 4 is a table that compares the level of extractables for COC-E and for TPE.

FIG. 4 shows that the level of extractables is much less for COC-E than for the thermoplastic elastomer (TPE) that, in this comparative example, comprises a mixture of 50% butyl rubber and 50% polyethylene.

As for elastomer materials, they present levels of extractables that are much greater still, such as, for example, nitrile rubber that has a level of extractables of about 14 milligrams per gram (mg/g), or EPDM that has a level of extractables that lies in the range 1.4 mg/g to 5.3 mg/g.

COC elastomer also presents significant barrier properties against water vapor, and mechanical properties that are entirely suitable for making valve gaskets, in particular its hardness and its Young's modulus. It also presents the ability to withstand abrasion. COC elastomer also presents good compatibility with active substances of the pharmaceutical type since there is no leaching of ions, no trace metals, it includes hydrophobic surfaces so that there is less absorption, and finally it can be designed easily, i.e. it is easy to make parts of any shape from this material.

By way of example and in non-limiting manner, the COC-E X1 T6 product sold by the supplier TOPAS ADVANCED POLYMERS is a material that is suitable for the present invention.

Other materials can also be envisaged for alloying with the COC elastomer, e.g. thermoplastic polyurethane elastomers (TPU). In a variant, it is possible to use an olefin-based thermoplastic polyester elastomer (TPE) material, e.g. a mixture of polypropylene (PP) and styrene-block copolymer (SBC); poly(ethylene octene) (PEO); poly(ethylene butene) (PEB); ethyl vinyl acetate (EVA); a mixture of PP and ethylene propylene diene monomer (EPDM). Other possible materials include: polyolefin; polybutylene terephthalate (PBT); polyoxymethylene (POM); polyamide (PA); polycarbonate (PC); polymethyl methacrylate (PMMA); polyvinyl chloride (PVC); acrylonitrile butadiene styrene (ABS); PP; polyethylene (PE); and alloys of all of these materials. Other possible materials include: thermoplastics alloys (nitrile butadiene rubber (NBR)/PP, butyl/PP, halobutyl/PP, hydrogenated nitrile butadiene rubber (HNBR)/PE); thermoplastic elastomers prepared by dynamic vulcanization; thermoplastic polyamide elastomers (polyether block amide (PEBA), polyesteramide (PEA), polyetheresteramide (PEEA), polycarbonate-esteramide (PCEA)); thermoplastic polyether ester elastomers; styrene-block copolymers (styrene-butadiene-styrene (SBS), styrene-isoprene-styrene (SIS), styrene-ethylene-butylene-styrene (SEBS), styrene-ethylene-propylene-styrene (SEPS), styrene-ethylene-ethylene-propylene-styrene (SEEPS), styrene-isoprene-butadiene-styrene (SIBS)); and mixtures of these materials.

Although the present invention is described above with reference to an embodiment thereof, as shown in the drawings, the invention is naturally not limited to that variant, but, on the contrary, any useful modifications could be applied thereto by the person skilled in the art. In particular, the valve could be of any structure. In addition, the shapes of the valve body and of the openings could be different from the shapes shown. The same applies to the reservoir, and in particular to its neck, and to the fastener hoop or capsule that could be made differently, e.g. by snap-fastening or screw-fastening. In general, any modification is possible without going beyond the ambit of the present invention as defined by the accompanying claims.

The invention claimed is:

1. A dispenser, comprising:
a ring arranged around a valve body of a fluid dispenser valve that is mounted by a fastener capsule on a reservoir, said reservoir containing a dispensable fluid and hydrofluoroalkane (HFA) propellant gas, said ring is made as a single piece including at least one inner portion that co-operates with said valve body, and a radial flange that forms a neck gasket that extends between the neck of the reservoir and the fastener capsule, said ring being made of a material that includes cyclo olefin copolymer elastomer (COC elastomer).

2. The dispenser according to claim 1, including a first radially-inner portion that co-operates with a portion of the valve body, and a second inner portion that co-operates with another portion of the valve body.

3. The dispenser according to claim 2, wherein said first radially-inner portion has a deformable lip.

4. The dispenser according to claim 3, wherein the contact surface of the lip with the valve body has a shape that is stepped.

5. The dispenser according to claim 3, wherein said lip includes a peripheral recess, wherein said peripheral recess is configured to allow said lip to deform.

6. The dispenser according to claim 1, including a deformable axial wall that extends towards the bottom of the reservoir, wherein said deformable axial wall is configured to deform elastically in a radially-inward direction.

7. The dispenser according to claim 6, wherein the outer surface of the deformable axial wall is substantially smooth before fastening the fastener capsule.

8. The dispenser according to claim 1, including, below said neck-gasket-forming radial flange, projecting profiles that are distributed around the outer periphery of said ring, said projecting profiles being separated by grooves.

9. The dispenser according to claim 1, wherein said ring is formed as a one-piece integral construction of COC elastomer.

10. The dispenser according to claim 1, wherein COC elastomer is a copolymer elastomer having a glass transition temperature lying in the range −10° C. to 15° C., a crystalline melting point lying in the range 50° C. to 120° C., a crystallinity by weight lying in the range 5% to 40%, and a norbornene content lying in the range 2 mol % to 15 mol %.

11. The dispenser according to claim 1, comprising an aerosol valve.

12. The dispenser according to claim 11, wherein said valve body includes at least one opening configured to enable fluid to pass from the reservoir into said valve body, said first radially-inner portion being situated at the bottom edge of said opening, in the inverted working position, with the valve arranged below said reservoir relative to a direction of gravitational force.

13. The dispenser according to claim 1, including a plurality of projecting profiles distributed around the outer periphery of the ring.

14. The dispenser according to claim 13, wherein the projecting profiles are separated by a plurality of grooves configured to allow the dispensable fluid or HFA propellant gas to escape during insertion of the ring into the reservoir.

15. The dispenser according to claim 1, including a plurality of axial recesses that extend around the periphery of the ring.

16. The dispenser according to claim 15, wherein the plurality of axial recesses are separated by a plurality of radial stiffening ribs.

17. The dispenser according to claim 1, wherein the fastener capsule is a crimpable capsule.

18. A dispenser, comprising:
a ring arranged around a valve body of a fluid dispenser valve that is mounted by a fastener capsule on a reservoir, said reservoir containing a dispensable fluid and hydrofluoroalkane (HFA) propellant gas, said ring is made as a single piece including at least one inner portion that co-operates with said valve body, and a radial flange that forms a neck gasket that extends between the neck of the reservoir and the fastener capsule, said ring being made of a material that includes cyclo olefin copolymer elastomer (COC elastomer);
wherein the COC elastomer is an elastomeric material of cyclo olefin copolymer with an increased polyethylene content and not a mixture or an alloy of conventional COC with an elastomer material; and
wherein the COC elastomer has a glass transition temperature in the range of −10° C. to 15° C., a crystalline melting point lying in the range of 50° C. to 120° C., a crystallinity by weight lying in the range 5% to 40%, and a norbornene content lying in the range 2 mol % to 15 mol %.

* * * * *